US008873662B2

(12) United States Patent
Sesia et al.

(10) Patent No.: US 8,873,662 B2
(45) Date of Patent: Oct. 28, 2014

(54) MIMO CONFIGURATION METHODS AND APPARATUS

(75) Inventors: Stefania Sesia, Roquefort les Pins (FR); Fabrizio Tomatis, Saint Laurent du Var (FR)

(73) Assignee: Ericsson Modems SA, Le Grand-Saconnex (CH)

( * ) Notice: Subject to any disclaimer, the term of this patent is extended or adjusted under 35 U.S.C. 154(b) by 106 days.

(21) Appl. No.: 13/440,771

(22) Filed: Apr. 5, 2012

(65) Prior Publication Data

US 2013/0266085 A1   Oct. 10, 2013

(51) Int. Cl.
H04B 7/02 (2006.01)
H04B 7/04 (2006.01)

(52) U.S. Cl.
CPC .................... H04B 7/0413 (2013.01)
USPC ........... 375/267; 375/295; 375/299; 455/101; 455/132; 455/500; 455/562.1; 370/334; 370/464

(58) Field of Classification Search
CPC .. H04B 7/0413; H04B 7/0617; H04B 7/0689; H04W 52/028; H04W 52/42; H04W 52/245; H04L 1/0003
USPC .......... 375/267, 295, 299; 455/101, 132, 500, 455/562.1; 370/334, 464
See application file for complete search history.

(56) References Cited

U.S. PATENT DOCUMENTS

| 7,248,656 B2 * | 7/2007 | da Silveira et al. ............ 375/346 |
| 8,233,846 B2 * | 7/2012 | Rofougaran ..................... 455/73 |
| 2009/0003485 A1 * | 1/2009 | Li et al. ......................... 375/299 |
| 2010/0098184 A1 * | 4/2010 | Ryoo et al. ..................... 375/267 |
| 2010/0284449 A1 | 11/2010 | De Veciana et al. |
| 2011/0053527 A1 | 3/2011 | Hunzinger |
| 2012/0009968 A1 | 1/2012 | Kludt et al. |

FOREIGN PATENT DOCUMENTS

| WO | 2009/034089 A1 | 3/2009 |
| WO | 2011/140149 A2 | 11/2011 |

OTHER PUBLICATIONS

EPO, Int'l Search Report in PCT/EP2013/057258, Jul. 15, 2013.
H.S. Kim et al., Energy-Constrained Link Adaptation for MIMO OFDM Wireless Communication Systems, Trans. Wireless Comm., Sep. 1, 2010, pp. 2820-2832, vol. 9, No. 9, IEEE.
QUALCOMM Inc., UE Reference Architectures for Derivation of CLTD UE Tx Core Requirements, Tdoc R4-120715, Jan. 30, 2012, 3GPP.

* cited by examiner

Primary Examiner — Leon Flores
(74) Attorney, Agent, or Firm — Leffler Intellectual Property Law, PLLC

(57) ABSTRACT

Multiple-input multiple-output (MIMO) with multiple power amplifiers and antennas in a mobile transmitter, such as a user equipment for a cellular telephone communication system, has such great impacts on the transmitter's battery life, form factor, and complexity that it should not be used unless its benefits clearly outweigh its costs. Methods and apparatus enable the benefits of MIMO by beam-forming and antenna-switching to be obtained without incurring the drawbacks of increased current consumption due to multiple power amplifiers.

20 Claims, 4 Drawing Sheets

MIMO CONFIGURATION METHODS AND APPARATUS

TECHNICAL FIELD

This application relates to wireless communication systems, and particularly to transmitters in such systems, and even more particularly to transmitters having multiple-input multiple-output configurations.

BACKGROUND

In many wireless communication systems, multiple-input multiple-output (MIMO) communication is an advanced antenna technique that is used to improve spectral efficiency and increase system capacity. Cellular radio telephone systems, such as Evolved Universal Terrestrial Access (E-UTRA), or Long Term Evolution (LTE), systems, and UTRA systems, such as Wideband Code Division Multiple Access (WCDMA) and High-Speed Packet Access (HSPA) systems, that are compliant with specifications by the Third Generation Partnership Project (3GPP), and wireless local area network (WLAN) systems, such as Wi-Fi systems and other systems, that are compliant with IEEE 802.11 and 802.16, are examples of communication systems that use MIMO communication to varying extents.

MIMO communication generally entails multiple antennas at both the transmitter side and the receiver side of a communication. The antenna configuration in a MIMO communication system is typically represented with a notation (M×N), where M is the number of transmit antennas and N is the number of receive antennas. MIMO antenna configurations commonly considered today include (2×1), (1×2), (2×2), (4×2), (8×2) and (8×4). The (2×1) and (1×2) configurations are special cases that are sometimes called transmit diversity and receiver diversity, respectively, and that are of particular interest for cellular radio telephone systems, among others.

MIMO communication enables spatial processing of transmitted and received signals that in general improves spectral efficiency, extends cell coverage, enhances user data rate, mitigates multi-user interference, etc. Different MIMO configurations have different benefits. For instance, the receiver diversity (1×2) configuration can improve cell coverage. For another example, the (2×2) configuration can increase peak user bit rate, even doubling the bit rate. Such improved data rate depends on whether the two communication channels between the transmitter and receiver are sufficiently uncorrelated so that the rank of the 2×2 MIMO channel matrix is 2. The rank of a matrix is the number of independent rows or columns of the matrix. In general, the average two-link data rate will be less than twice the data rate achieved for a single link due to correlation between the links.

In cellular radio telephony, for example, MIMO techniques have been widely studied and applied for downlink communication, i.e., communication from base stations or equivalent network nodes to user equipments (UEs). For example, the (2×2) configuration will be used in WCDMA Release 7, and E-UTRA systems will support several MIMO configurations in the downlink, including single-user MIMO (SU-MIMO) and multiple-user MIMO (MU-MIMO).

MIMO techniques have typically been used only for downlink transmission because they increase the complexity of both the transmitter and the receiver compared to single-input single-output (SISO) communication. For example on the radio frequency (RF) side, a transmitter can need several RF power amplifiers (PAs) and several transmit antennas depending on the MIMO configuration, and a receiver can need several receive antennas and several chains of RF signal processing components depending on the MIMO configuration. Moreover, each MIMO configuration adds complexity in the base-band signal processing of the transmitter and receiver. Nevertheless, downlink MIMO with multiple PAs and antennas is considered feasible in a base station because the base station has fewer constraints on form factor and battery life.

The multiple transmit antennas in a MIMO configuration can be used in several different ways, such as antenna-switching and beam-forming. In general, antenna-switching leads to less improvement in communication performance than beam-forming does, but antenna-switching configurations can be easier to implement. If a transmitter, such as a UE, has some information about its uplink communication channel, the transmitter can use that information to steer its transmitted signal in the direction of the receiver by beam-forming with its multiple antennas. The channel information would be fed back to the transmitter by the receiver, and so such operation is a closed-loop multi-antenna technique. Open-loop multi-antenna techniques are based on the assumption that the transmitter, such as a UE, does not have information about the uplink channel, and so the transmitter cannot use such information for beam-forming.

FIG. 1 is a block diagram of a transmitter 100 that is configured for MIMO by antenna-switching. As depicted in FIG. 1, the transmitter 100 includes a suitable modulator 102 that up-converts or otherwise impresses an input signal onto a carrier signal appropriate to the communication system. The modulated carrier signal generated by the modulator 102 is provided to a PA 104 that increases the power of the modulated carrier signal. The amplified signal generated by the PA 104 is directed to one of two antennas 106, 108 by operation of a suitable switch 110 that is controlled by a signal generated by an antenna selector 112. As the antenna(s) in many communication devices are used for both transmitting and receiving, FIG. 1 shows duplexers 114, 116 that separate signals received by the antennas 106, 108 from the signal to be transmitted and direct those received signals to a receiver portion (not shown) of the communication device.

With the antenna-switching architecture depicted in FIG. 1, a transmitter such as a UE in a cellular telephone system has only a single PA but can achieve transmit diversity by switching the output of the PA 104 between the multiple antennas 106, 108. It can be shown that the fading uplink communication channels seen by the respective antennas are different, which is to say that the antennas are partially uncorrelated, and so by switching antennas, the transmitter can exploit the diversity of the channels.

FIG. 2 is a block diagram of a portion 200 of a transmitter that is configured for antenna beam-forming using two antennas. The modulator is omitted from FIG. 2 simply for clarity, and so FIG. 2 shows two modulated signals 1, 2 that are provided to a beam-forming processor 202, which combines the modulated signals 1, 2 according to a suitable beam-forming algorithm. Beam-formed signals generated by the processor 202 are provided to PAs 204, 206, and respective antennas 208, 210.

The beam-forming processor 202 applies a beam-forming vector or matrix W to the modulated signals 1, 2 to be transmitted before those signals are provided to the PAs 204, 206, which for example can be configured either as two full-power PAs or as one full-power PA and one half-power PA or as two half-power PAs. A full-power PA enables the transmitter to reach a nominal maximum transmit power, e.g., 23 dBm.

As depicted in FIG. 2, the beam-forming processor 202 implements the beam-forming vector or matrix as a multiplication-and-summing network, in which multiplicative weights w1, w2, . . . , w4 are applied to the modulated signals and the weighted modulated signals are summed to produce the beam-formed signals provided to the PAs. The weights w1, w2, . . . , w4 of the beam-forming matrix, which is to say the values of the elements of the vector W, can be either pre-defined and provided to the transmitter by the receiver through suitable signaling in closed-loop transmit diversity (CLTD), or optimized by the transmitter in open-loop transmit diversity (OLTD) by exploiting information already available in the UE, for example. As a result of the matrix W, the signal power transmitted by the antennas can be steered into a selected direction in order to maximize the probability of correct reception.

Recently, the 3GPP has started work on specifications that call for uplink transmit diversity (2×1) MIMO for Release-11 UTRA systems and on uplink MIMO for Release-11 E-UTRA systems. In a UTRA communication system for example, a UE can implement uplink transmit diversity (ULTD) with both antenna-switching and beam-forming. CLTD in such systems is "network-controlled", which is to say that the network commands the UE to use a particular MIMO configuration by a transmitted precoding indicator (TPI) that is sent from a base station to the UE over a downlink fractional channel (F-TPICH).

CLTD theoretically provides a benefit in terms of throughput, while the benefit of OLTD depends more on the channel conditions and on the antenna selection algorithm used by the transmitter. To complicate things further, the benefit of OLTD may generally be less than the benefit of beam-forming, but under some conditions, it can be more beneficial to use antenna-switching.

3GPP has recently decided that under CLTD the base station or NodeB decides how the UE is configured, and so the base station indicates to the UE which of several predetermined beam-forming vectors W the UE should use in order to optimize its communication performance. The predetermined vectors are vectors of phases only, and so do not exploit the possible degrees of freedom in the amplitudes of the vector elements. Another possible problem with network-based control is that the base station can decide on a UE transmitter configuration that is not optimal from the UE's point of view.

FIG. 3 illustrates that a transmitter having a beam-forming architecture as in FIG. 2 can become inefficient from the point of view of the transmitter's current consumption. FIG. 3 depicts an example of an efficiency-vs-output power curve for a typical PA, showing a central linear region that is typically used for operation between minimum and maximum power levels. It will be noted that the relationship is non-linear, and at low power levels, the PA is less efficient. Thus, current consumed by the PA is not efficiently converted into output power. Different PAs can have different efficiency-vs-power curves, of course, but such curves are typically non-linear at low enough power levels. Due to the non-linear behavior of PAs at low power as depicted in FIG. 3, there is effectively a power floor below which ULTD or any multi-antenna technique using multiple PAs is no longer efficient.

In order to overcome this problem, existing solutions for CLTD could be based on having the UE signal the network about the inefficiency of the UE's PAs and ask the network to switch off the ULTD feature. A drawback of such solutions is that the network typically is not required to follow information from the UE, and so the network is not required to switch off ULTD even when a UE asks for it. Moreover, the UE-base station signaling wastes useful system resources, especially if the signaling needs to follow the UE's transmit power level and so maximize usage of ULTD.

Although a UE or other transmitter that implements the architecture of FIG. 1 may not suffer the drawbacks of increased current consumption in the architecture of FIG. 2, a transmitter as in FIG. 1 also does not support beam-forming, which can provide more improved performance. Another way that a UE can use to solve its current consumption problem is to switch off transmit diversity altogether, but doing so does not allow the UE to exploit any of the benefits of transmit diversity.

SUMMARY

In accordance with aspects of this invention, there is provided a method of controlling a multiple-input multiple output (MIMO) configuration in a transmitter for a communication system having at least two antennas, at least two amplifiers, a switching network configured for connecting the at least two amplifiers to the at least two antennas, and a configuration processor configured for applying a selected one of at least two configuration matrices to modulated signals to be transmitted before the modulated signals are provided to the at least two amplifiers, each of the at least two configuration matrices corresponding to a respective MIMO configuration. The method includes monitoring a parameter that corresponds to a current consumption of the transmitter; determining whether a predetermined condition of the parameter has occurred; and if it is determined that the predetermined condition has occurred, autonomously selecting a MIMO configuration based on the parameter.

Also in accordance with aspects of this invention, there is provided an apparatus for controlling a MIMO configuration in a transmitter for a communication system having at least two antennas, at least two amplifiers, a switching network configured for connecting the at least two amplifiers to the at least two antennas, and a configuration processor configured for applying a selected one of at least two configuration matrices to modulated signals to be transmitted before the modulated signals are provided to the at least two amplifiers, each of the at least two configuration matrices corresponding to a respective MIMO configuration. The apparatus includes an electronic processor circuit configured for monitoring a parameter that corresponds to a current consumption of the transmitter; for determining whether a predetermined condition of the parameter has occurred; and if it is determined that the predetermined condition has occurred, for autonomously selecting a MIMO configuration based on the parameter.

BRIEF DESCRIPTION OF THE DRAWINGS

The several features, objects, and advantages of this invention will be understood by reading this description in conjunction with the drawings, in which.

DETAILED DESCRIPTION

This application describes MIMO configurations of transmitters for communication systems, such as cellular radio telephone systems, but it will be understood that this invention is not limited to such communication systems.

MIMO with multiple PAs and antennas in a mobile transmitter, such as a UE in a cellular telephone communication system, has such great impacts on the transmitter's battery life, form factor, and complexity that it should not be used unless its benefits clearly outweigh its costs. The inventors have recognized that the benefits of MIMO by beam-forming and antenna-switching can be obtained without incurring the drawbacks of increased current consumption due to multiple PAs.

Figure 1:
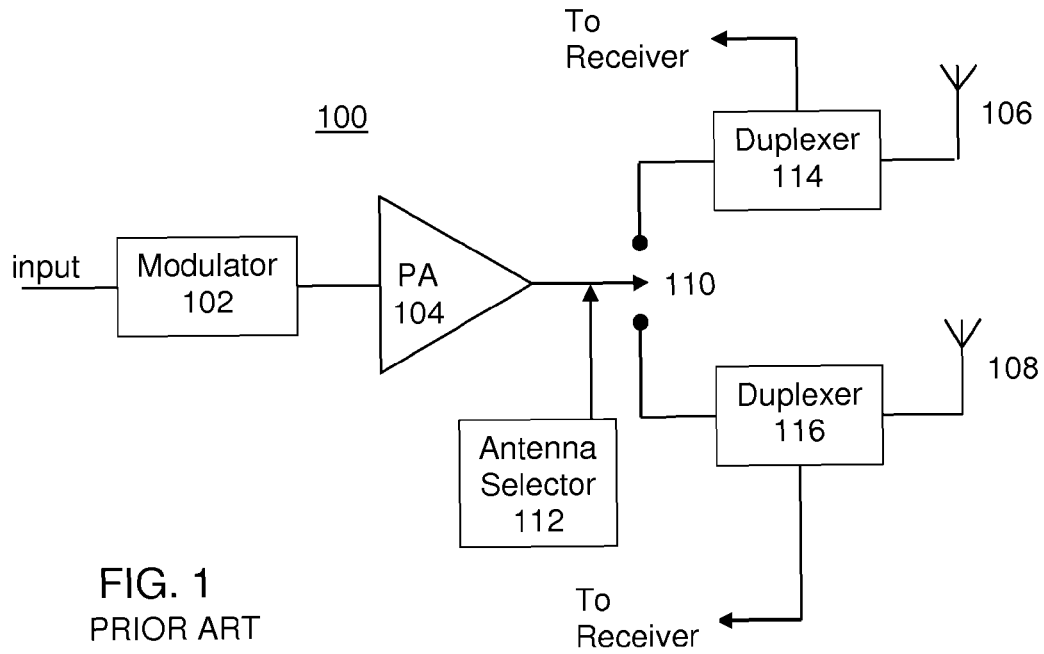
FIG. 1 is a block diagram of a transmitter configured for MIMO by antenna-switching in a communication system.
Figure 2:
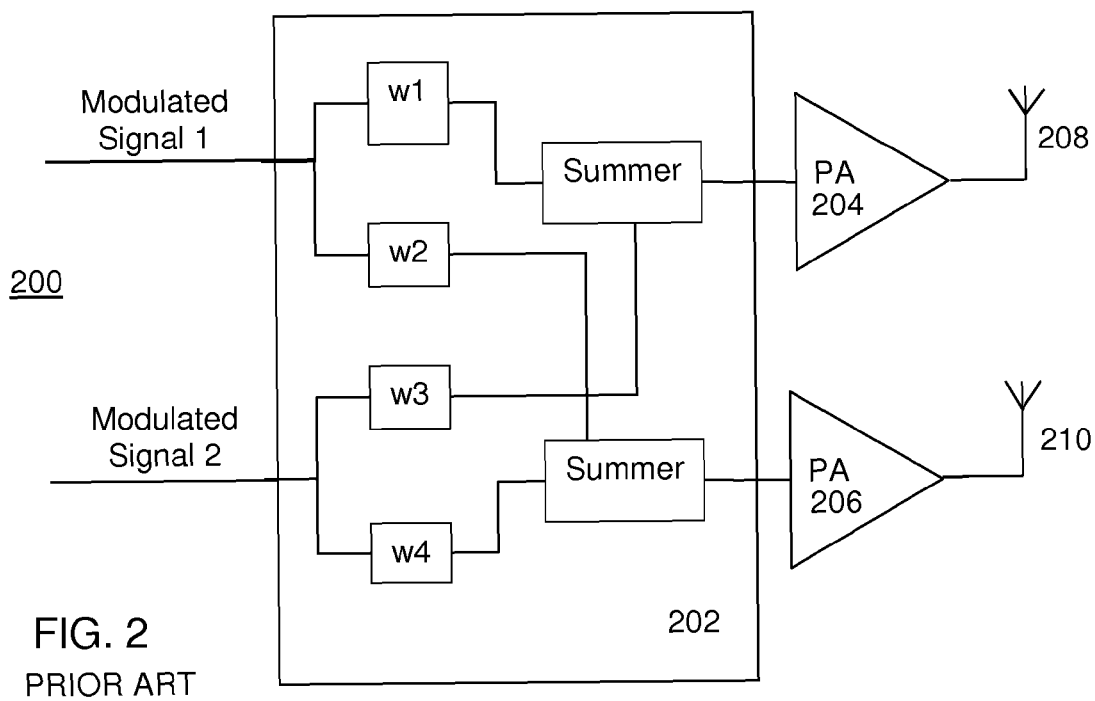
FIG. 2 is a block diagram of a portion of a transmitter configured for MIMO by beam-forming in a communication system.
Figure 4:
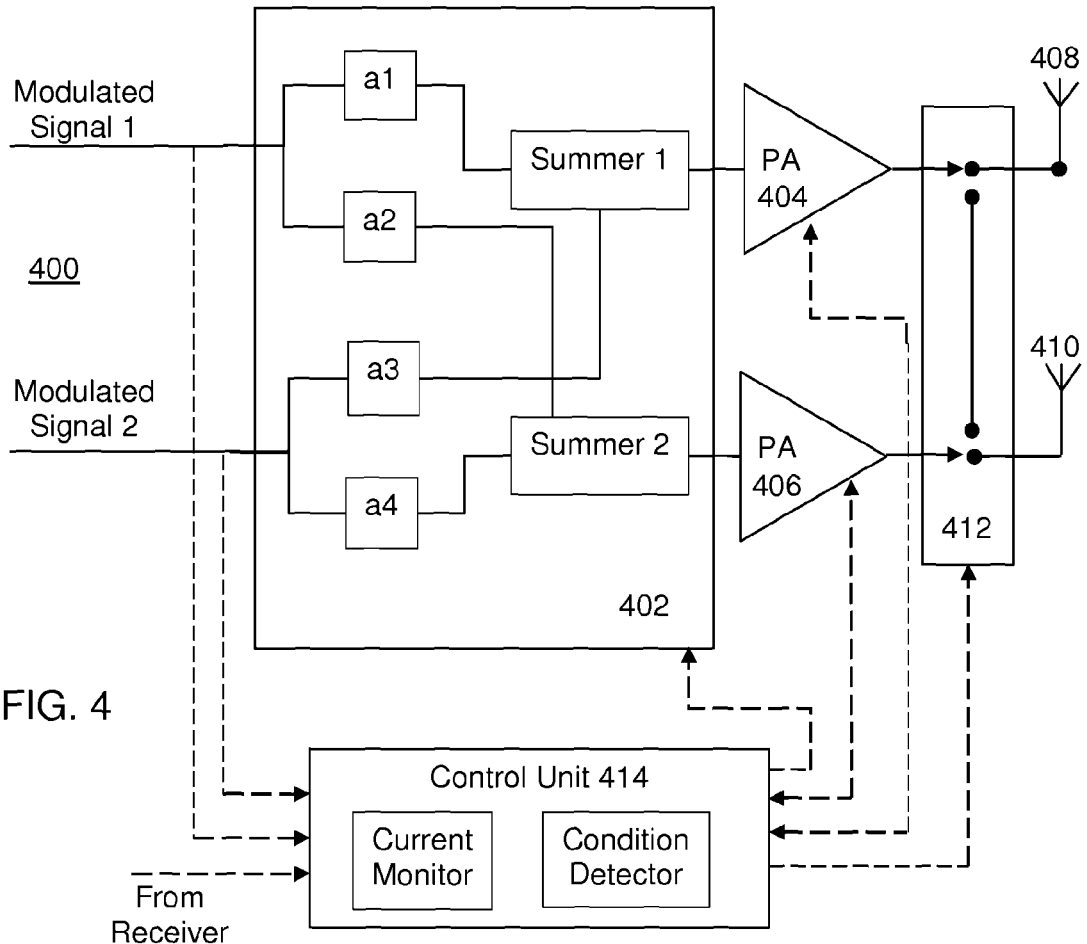
FIG. 4 is a block diagram of an improved transmitter selectively configured for MIMO by antenna-switching and beam-forming in a communication system.

FIG. 4 is a block diagram of a transmitter 400 that includes an apparatus for controlling a MIMO configuration, such as antenna-switching and beam-forming. Like FIG. 2, the modulator is omitted from FIG. 4 simply for clarity, and so FIG. 4 shows two modulated signals 1, 2 that are provided to a configuration processor 402. Signals generated by the processor 402 are provided to PAs 404, 406, which for example can be configured either as two full-power PAs or as one full-power PA and one half-power PA as described above in connection with FIG. 2. Signals generated by the PAs are provided to antennas 408, 410 through a switching network 412.

Operations of the configuration processor 402, PAs 404, 406, and switching network 412 are responsive to control signals generated by a control unit 414, which can be a suitably programmed electronic processor circuit, a suitably configured logic circuit or circuits, etc. Control signals provided to and/or generated by the control unit 414 are indicated in FIG. 4 by dashed lines. The control signals provided by the control unit 414 to the switching network 412, PAs 404, 406, and configuration processor 402 are based on a parameter that corresponds to a current consumption of the transmitter 400. The parameter can be the current consumption itself, the transmitted power level of the transmitter, or other parameters discussed in more detail below, including parameters derived from signals received at the transmitter.

The configuration processor 402, which can be a suitably programmed electronic processor circuit, applies a configuration matrix A to the modulated signals 1, 2 to be transmitted before those signals are provided to the PAs 404, 406. For example, the processor 402 can implement a multiplication-and-summing network, in which multiplicative weights a1, a2, ..., a4 are applied to the modulated signals 1, 2 and the weighted modulated signals are summed to produce the signals provided to the PAs. Such an implementation is useful for modulated signals 1, 2 that can be combined by simple summing, such as one or more of dedicated packet control channel (DPCCH) and dedicated packet data channel (DPDCH) signals transmitted by a UE in a UTRA or E-UTRA communication system.

It will be understood that the modulated signals 1, 2 in general are suitable for the particular communication system in which the transmitter 400 is used. As noted above, the arrangement of multipliers and summers implemented by a configuration processor 402 as depicted in FIG. 4 is an example suitable for modulated signals in WCDMA and LTE communication systems. The configuration processor 402 can be configured by suitable programming to implement other arrangements. For example, in an alternative to combining the modulated signals 1, 2, the weights can be configured such that one of the modulated signals 1, 2 is effectively ignored, e.g., by setting the values of a suitable pair or set of weights to zero. Such an arrangement is suitable for modulated signals 1, 2 that are not suitable for combining by addition (e.g., signals that are not digital spread-spectrum signals). Moreover, it will be noted that the configuration processor 402 can in general be configured by suitable programming to generate distinct signals that are provided to respective ones of the PAs 404, 406 and transmitted by respective ones of the antennas 408, 410.

The configuration matrix A implemented by the processor 402 is selected by the suitable control signal or signals from the control unit 414, and the selected matrix A can be either an antenna-switching vector or matrix or a beam-forming vector or matrix. Thus, the configuration processor 402 is configured to apply a selected one of at least two configuration matrices A to the modulated signals 1, 2 to be transmitted before the modulated signals are provided to the at least two PAs 404, 406.

By controlling the weights a1, a2, ..., a4 that correspond to elements in the matrix A=[a1, a2; a3, a4], the control unit 414 can control the MIMO configuration of the transmitter 400, e.g., configuring the transmitter for antenna-switching MIMO by directing both modulated signals 1, 2 to the same PA, or for beam-forming MIMO by directing each of the modulated signals 1, 2 to a respective PA. In the arrangement depicted in FIG. 4, antenna-switching can be configured by setting a1=a3=1, which directs the modulated signals to the PA 404, or by setting a2=a4=1, which directs the modulated signals to the PA 406. In either case, the other two weights can be set to zero, but that is not necessary as the other PA can simply be powered down or disconnected from the antennas as described below. Beam-forming can be configured by setting a1=a3=1, which directs the modulated signals to the PA 404, and also setting a2=a4=1, which directs the modulated signals to the PA 406.

As indicated by FIG. 4, the transmitter 400 can be arranged so that PAs can be individually controlled, and either the PA 404 or the PA 406 can be connected to a selected antenna by operation of the switching network 412. It will be understood that such an arrangement is not required. In an alternative arrangement, the control unit 414 can be configured to power up or down only a particular one of the PAs 404, 406, and the switching network can be such that it controlled to connect the other one of the PAs to the selected antenna.

Depending for example on the current consumption of the transmitter 400, the transmitter can autonomously switch off one of the PAs 404, 406 and/or change the weights of the matrix A, and thereby provide transmit diversity by antenna-switching. As depicted in FIG. 4, the current consumption can be determined by the control unit 414 in any suitable way, e.g., by detecting the power level of transmitted signals, the electrical currents drawn by the PAs, and other transmitter parameters that correspond to the transmitter's power consumption. The switching of the PAs and antennas and changing of the weights can be implemented by suitably programming the control unit 414, which implements methods of controlling a transmitter's MIMO configuration as described in this application.

The artisan will understand that the following discussion of a method of controlling a MIMO configuration of a transmitter considers an example in which the matrix weights a1=a3=1, and that the example is generally representative of other arrangements, e.g., examples in which the matrix weights a2=a4=1 and examples in which there are more than two PAs, more than two antennas, and more than four matrix weights. It will be noted that the configuration of the switching network 412 corresponds to the antenna(s) and PA(s) selected according to the matrix A. Among the benefits of a method of controlling a transmitter's MIMO configuration are that the transmitter can support transmit diversity and show coverage gains with reasonable current consumption and thereby extended battery life.

Figure 5:
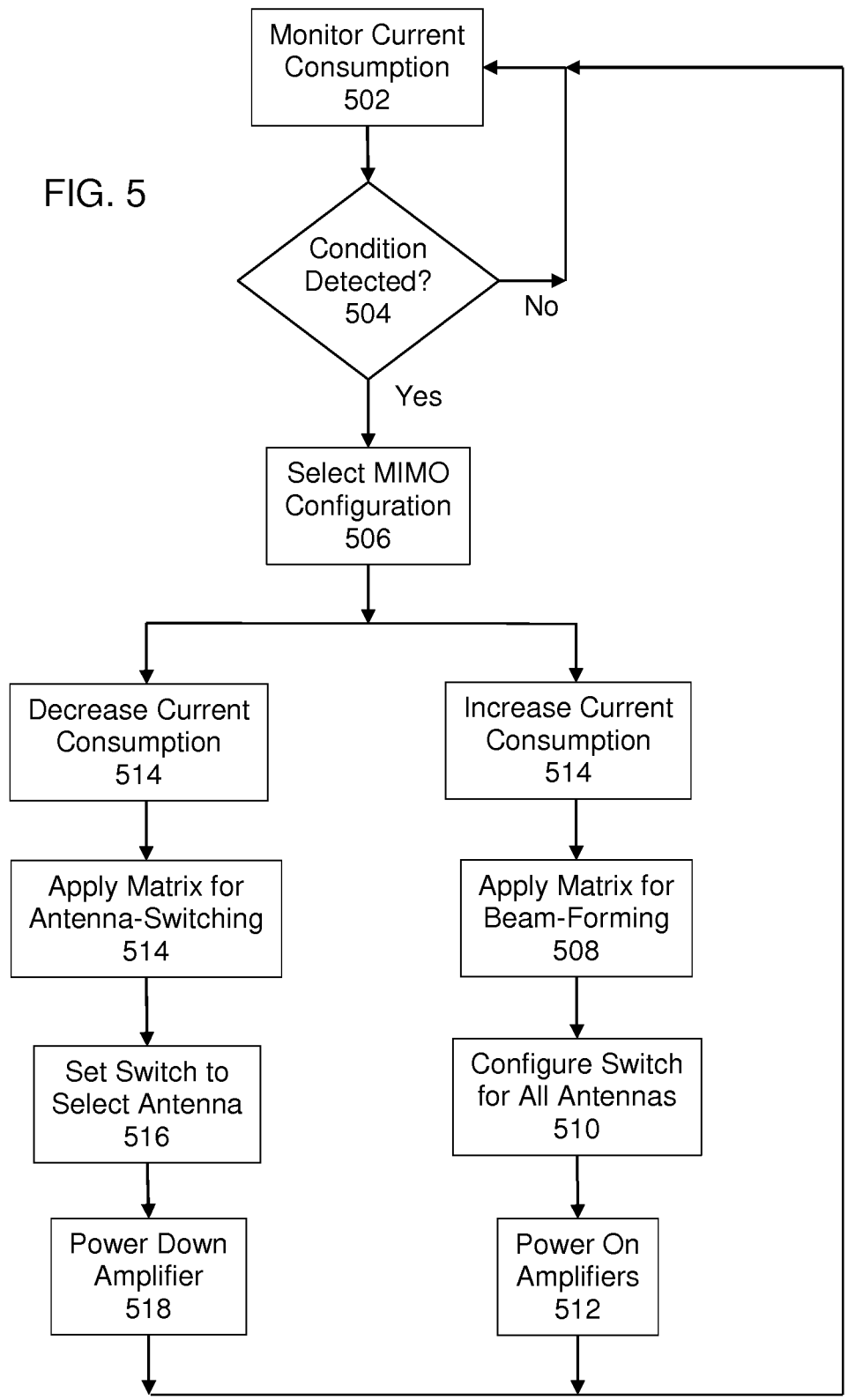
FIG. 5 is a flow chart of an example of a method of controlling a MIMO configuration of a transmitter for a communication system.

FIG. 5 is a flow chart of an example of a method of controlling a MIMO configuration of a transmitter in a communication system that can be implemented by an arrangement such as that depicted in FIG. 4. In step 502, the control unit 414 monitors the current consumption or other suitable parameter of the transmitter 400 in its initial MIMO configuration, and in step 504, the control unit determines whether a predetermined condition of the parameter, e.g., increased current consumption, increased transmit power level, receipt of a scheduling grant, etc., has occurred. If the condition has not been detected (No in step 504), the process flow returns to monitoring the current consumption or other parameter. If occurrence of the condition has been detected (Yes in step 504), the control unit 414 autonomously selects (step 506), i.e., without command from another node in the communication system, a MIMO configuration based on the parameter.

If the detected condition is such that the control unit determines to use a MIMO configuration having increased current consumption (step 508), such as beam-forming, the control unit arranges for applying (step 510) the matrix A as a beam-forming matrix to signals to be transmitted. Thus, the transmitter 400 autonomously optimizes the beam-forming weights, which can be seen as an implementation of OLTD independent of control by the communication system. The control unit 414 also configures (step 512) the switching network 412 such that matrix-processed signals produced by the matrix A operation are directed to both of the antennas 408, 410. The control unit also powers up (step 514) both of the PAs 404, 406.

If the detected condition is such that the control unit determines to use a MIMO configuration having reduced current consumption (step 516), such as antenna-switching, the control unit arranges for applying (step 518) the matrix A as an antenna-switching matrix (e.g., by setting matrix elements a1=a3=1 and a2=a4=0). Thus, the transmitter 400 autonomously selects antenna-switching, which can also be seen as an implementation of OLTD independent of control by the communication system. The control unit 414 also configures (step 520) the switching network 412 such that the matrix-processed signals, e.g., signals generated by the configuration processor 402, as a result of the matrix A operation are directed to the antenna 408 or to the antenna 410 according to any suitable antenna switching algorithm implemented by the control unit 414 or other device in the transmitter 400, and the control unit also powers down (step 522) the other one(s) of the PAs.

After transmitter configuration has been completed (i.e., after steps 514, 522), the process flow returns to monitoring the transmitter's current consumption or other parameter of interest (step 502), and periodically or otherwise determining whether the condition of interest has occurred (step 504).

Figure 3:
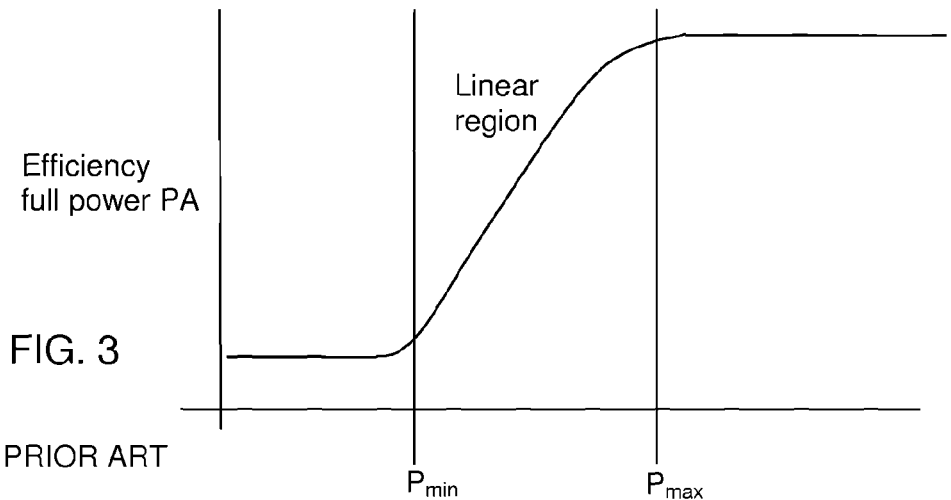
FIG. 3 illustrates efficiency with respect to output power of a power amplifier.

With the method depicted in FIG. 5, a transmitter can change its MIMO configuration, e.g., change from beam-forming to antenna-switching and back, and thereby avoid problems caused by the typically high current consumption required by beam-forming and still enjoy benefits of transmit diversity. The need for changing the transmitter's MIMO configuration can arise from a need to reduce the transmitter's current consumption, which can arise from the fact that the relationship of efficiency and output power of a PA is typically non-linear, as depicted in FIG. 3 described above.

It will be noted that algorithms for antenna-switching and for choosing which antenna to use are well known in the literature, and can be readily implemented by suitably programming or otherwise configuring the control unit 414 and configuration processor 402.

It will also be noted that the description of FIG. 5 above can be seen as an implementation of OLTD, e.g., UE-controlled OLTD in a cellular radio telephone system. The method illustrated by FIG. 5 can also be readily applied in a number of ways in a transmitter capable of UE-controlled, network-assisted CLTD in such a communication system. For network-assisted CLTD, a base station or other network node sends the UE or other transmitter information about the channel from the transmitter to the network, and the control unit 414 uses such information in the transmitter's autonomous selection of its MIMO configuration.

As noted above, a suitable condition of increased current consumption is increased transmitted power, which can be readily detected in any suitable way. The transmitted power level is known at the transmitter, and in many modern communication systems, the transmitted power level is varied from time to time in response to transmit power control commands. In UTRA and E-UTRA communication systems for example, the transmitted power level is varied on a time-slot basis, and so transmitted power level variations can be due to one or more of slow channel fading, changes in relative distance between the transmitter and receiver, channel transport format changes, transmitter state changes, etc.

The inventors have recognized that a MIMO configuration should be selected that actually benefits both the transmitter, such as a UE in a cellular radio telephone system, and the receiver, such as a base station in the system. Thus, the determination of whether a condition of interest has occurred (i.e., step 504 in FIG. 5) can be based on comparison of an actual transmitted power level or a received command for a transmitted power level with a suitable threshold value to determine if the PA is or will be operating near or below a power level, which can be called Pmin, at which the PA is no longer efficient. The Pmin level of a transmitter 400 can be known to the transmitter via detailed specification of the PAs 404, 406 or it can be determined by the transmitter via a self-calibration procedure based on PA measurements. Suitable techniques for determining PA specifications and suitable self-calibration procedures are well known in the literature.

In order to have a robust method of controlling the transmitter's MIMO configuration and to avoid ping-pong effects that can degrade the transmitted signal quality due to fast changes in configuration, it is preferable to select the MIMO configuration (i.e., step 506 in FIG. 5) with hysteresis. Thus, let P represent the transmitter's transmitted power level, and let Pmin1 be the transmitted power level below which the PAs 404, 406 are considered to cause an increased current consumption compared to a single PA, i.e., to operate inefficiently without the inefficiency being outweighed by the benefit of beam-forming. The power level Pmin1 can be called the PA switching point. In addition, let Pmin2 be the transmitted power level above which the PAs 404, 406 are considered to have an acceptable power consumption compared to a single PA, i.e., to operate with increased current consumption that is outweighed by the benefit of beam-forming. It will be seen that Pmin1 can be adjusted to be more or less conservative: the lower is Pmin1, the lower is the probability of de-activating one of the PAs and reducing the transmitter's power consumption, and vice versa. Like Pmin1, Pmin2 can be adjusted to enable faster or slower activation of the PAs 404, 406 and so faster or slower enjoyment of beam-forming gains.

Figure 6:
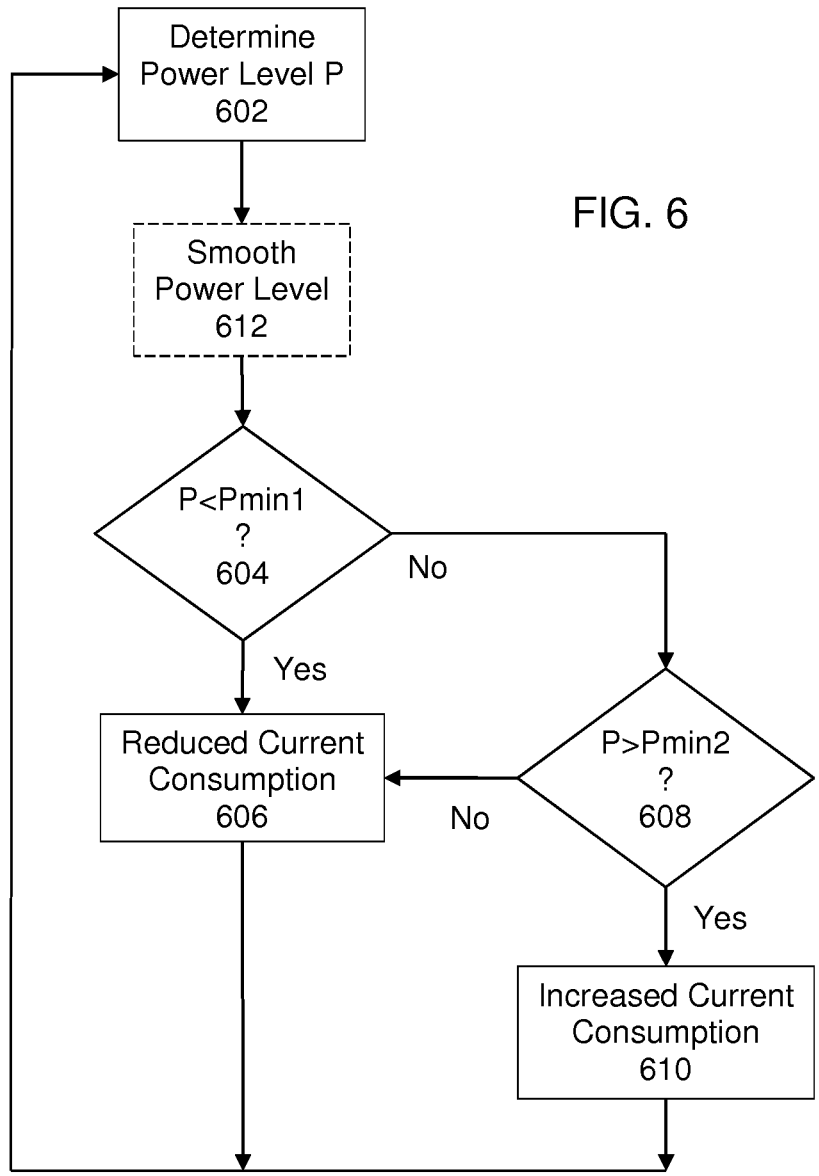
FIG. 6 is a flow chart of an example of a method of determining whether a predetermined condition of a parameter has occurred.

FIG. 6 is a flow chart of an example of a method of selecting a transmitter's MIMO configuration with hysteresis. In step 602, the control unit 414 determines the transmitted power level P, or a corresponding parameter, and compares (step 604) P and Pmin1, which can be considered a first threshold. If the transmitted power level P is less than Pmin1 (Yes in step 604), the transmitter's current consumption is reduced by selecting the reduced-current MIMO configuration (step 606), e.g., antenna-switching (steps 516-518).

If the transmitted power level P is not less than Pmin1 (No in step 604), the control unit 414 compares (step 608) the power level P and Pmin2, which can be considered a second threshold. If the transmitted power level P does not exceed Pmin2 (No in step 608), the reduced-current MIMO configuration is selected.

If the transmitted power level P exceeds Pmin2 (Yes in step 608), the transmitter's current consumption is increased by selecting the increased-current MIMO configuration (step 610), e.g., by beam-forming (steps 508-514).

After a MIMO configuration selection is made, the program flow returns to step 602. It will be seen that as long as the parameter P is less than the second threshold Pmin2, the transmitter will implement the reduced-current MIMO configuration.

The method illustrated by FIG. 6 can be modified further to reduce the possibility of ping-ponging between MIMO configurations (e.g., between antenna-switching and beam-forming) by smoothing (step 612) the measurements of the transmitted power level, for example with an adjustable low-pass filter, such as a finite-impulse response (FIR) filter having a programmable length L or an infinite-impulse response (IIR) filter having a programmable forgetting factor a. Such a filter can be readily implemented by suitably programming the control unit 414 or by another suitable device in the transmitter. The filtered transmitted power level is then compared with the thresholds Pmin1, Pmin2, in deciding which MIMO configuration to use.

It will be noted that the methods depicted in FIGS. 5 and 6 can be used when the condition of increased current consumption is reception of a scheduling grant assigned by the network to the UE in an E-UTRA communication system. Such a network uses enhanced absolute and relative grant channels (E-AGCH and E-RGCH) to provide the UE with the absolute or relative limit of the transmitted power level that the UE can use. Those channels are used in order to inform the UE what data rate the UE should use. An absolute grant is typically used for large data rate changes, and a relative grant is typically used to move the data rate up or down by smaller amounts or to keep the current data rate.

Transmitter current consumption is directly related to the data rate the UE uses to send data, and the data rate is in turn related to the transmitted power level. In some embodiments, therefore, a UE can use the methods of FIGS. 5 and 6 based on the absolute and relative grant level obtained from the network in order to decide whether to switch its PAs on or off. For a low-data-rate scheduling grant, the UE should switch off its second PA and reduce its current consumption (i.e., the antenna-switching configuration), and for a high-data-rate scheduling grant, the UE should use both PAs (i.e., the beam-forming configuration).

It will be appreciated, of course, that a combination of transmitted power level and either or both of received absolute and relative scheduling grants can alternatively be used as a triggering condition in step 504. For example, the UE can power down one of its PAs (and use antenna-switching) for a condition of a low-rate scheduling grant and/or a low transmitted power level, and the UE can power up all of its PAs (and use beam-forming) for a condition of a high-rate scheduling grant and/or a high transmitted power level.

Depending on the condition detected, the control unit 414 causes the transmitter 400 to take on either its full-current-consumption configuration (Steps 508-514) or its reduced-current-consumption configuration (Steps 518-522). For Steps 508-514, the matrix A follows beam-forming principles, either by following a pre-coding matrix indication provided to the transmitter by a network in CLTD, or by autonomously optimizing the beam-forming weights in OLTD. For Steps 518-522, the matrix A follows antenna-switching methodology, e.g., $a1=a3=1$ and $a2=a4=0$.

Among their several advantages, methods and apparatus in accordance with this invention can implement better tradeoffs between throughput performance of uplink transmit diversity and efficient power consumption, saving battery life. In addition, hysteresis renders the methods and apparatus robust in the presence of propagation channel fading. Furthermore, transmitter configuration changes (ping-ponging) can be reduced, thereby reducing transmitted signal distortion.

The artisan will understand that the methods and apparatus described in this application can be implemented in many types of electronic communication systems, such as cellular radio telephone systems, including UEs and even base stations in such systems. It will be appreciated that the functional blocks depicted in FIG. 4 can be combined and re-arranged in a variety of equivalent ways, and that many of the functions can be performed by one or more suitably programmed electronic digital signal processor circuits and other known electronic circuits. Moreover, connections among and information provided or exchanged by the functional blocks depicted in FIG. 4 can be altered in various ways to enable a transmitter to implement other methods involved in its operation.

The invention described here can be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. As used here, a "computer-readable medium" can be any device that can contain, store, or transport the program for use by or in connection with the instruction-execution system, apparatus, or device. The computer-readable medium can be, for example but not limited to, an electronic, magnetic, optical, electromagnetic, infrared, or semiconductor system, apparatus, or device. More specific examples (a non-exhaustive list) of the computer-readable medium include an electrical connection having one or more wires, a portable computer diskette, a RAM, a ROM, and an erasable programmable read-only memory (EPROM or Flash memory).

It is expected that this invention can be implemented in a wide variety of environments, including for example mobile communication devices. It will also be appreciated that procedures described above are carried out repetitively as necessary. To facilitate understanding, aspects of the invention are described in terms of sequences of actions that can be performed by, for example, elements of a programmable computer system. It will be recognized that various actions can be performed by specialized circuits (e.g., discrete logic gates interconnected to perform a specialized function or application-specific integrated circuits), by program instructions executed by one or more processors, or by a combination of both.

Thus, the invention may be embodied in many different forms, not all of which are described above, and all such forms are contemplated to be within the scope of the invention. For each of the various aspects of the invention, any such form may be referred to as "logic configured to" perform a described action, or alternatively as "logic that" performs a described action. It is emphasized that the terms "comprises" and "comprising", when used in this application, specify the presence of stated features, integers, steps, or components and do not preclude the presence or addition of one or more other features, integers, steps, components, or groups thereof.

The particular embodiments described above are merely illustrative and should not be considered restrictive in any way.

What is claimed is:

1. A method of controlling a multiple-input multiple output (MIMO) configuration in a transmitter for a communication system, the transmitter having at least two antennas, at least two amplifiers, a switching network configured for connecting the at least two amplifiers to the at least two antennas, and a configuration processor configured for applying a selected one of at least two configuration matrices to modulated signals to be transmitted before the modulated signals are provided to the at least two amplifiers, each of the at least two configuration matrices corresponding to a respective MIMO configuration, the method comprising:
   (a) monitoring a parameter that corresponds to a current consumption of the transmitter;
   (b) determining whether a predetermined condition of the parameter has occurred; and
   (c) if it is determined that the predetermined condition has occurred, autonomously selecting a MIMO configuration based on the parameter,
   wherein selecting a MIMO configuration based on the parameter includes determining to reduce the current consumption, applying an antenna-switching matrix to the signals to be transmitted, and configuring the switching network such that matrix-processed signals to be transmitted are directed to one of the at least two amplifiers and one of the at least two antennas.

2. The method of claim 1, wherein the switching network is configured such that one of the at least two amplifiers is connected to a selected one of the at least two antennas, and others of the at least two amplifiers are powered down.

3. The method of claim 1, wherein the parameter corresponds to a transmitted power level of the transmitter or currents drawn by the at least two amplifiers.

4. The method of claim 1, wherein selecting a MIMO configuration based on the parameter includes applying a matrix of multiplicative weights to the modulated signals to be transmitted and summing weighted modulated signals.

5. The method of claim 1, wherein the MIMO configuration is selected based on information received by the transmitter about a communication channel from the transmitter.

6. A method of controlling a multiple-input multiple output (MIMO) configuration in a transmitter for a communication system, the transmitter having at least two antennas, at least two amplifiers, a switching network configured for connecting the at least two amplifiers to the at least two antennas, and a configuration processor configured for applying a selected one of at least two configuration matrices to modulated signals to be transmitted before the modulated signals are provided to the at least two amplifiers, each of the at least two configuration matrices corresponding to a respective MIMO configuration, the method comprising:
   (a) monitoring a parameter that corresponds to a current consumption of the transmitter;
   (b) determining whether a predetermined condition of the parameter has occurred; and
   (c) if it is determined that the predetermined condition has occurred, autonomously selecting a MIMO configuration based on the parameter,
   wherein selecting the MIMO configuration includes comparing a transmitter value and a first threshold value, and when the transmitter value is less than the first threshold value, applying an antenna-switching matrix to the signals to be transmitted, and configuring the switching network such that matrix-processed signals to be transmitted are directed to one of the at least two amplifiers and one of the at least two antennas.

7. The method of claim 6, wherein selecting the MIMO configuration further includes, if the transmitter value of the parameter is not less than the first threshold value, comparing the transmitter value and a second threshold value, and when the transmitter value exceeds the second threshold value, applying a beam-forming matrix to signals to be transmitted and configuring the switching network such that matrix-processed signals to be transmitted are directed to all of the at least two amplifiers and all of the at least two antennas.

8. The method of claim 6, wherein the parameter corresponds to a transmitted power level of the transmitter or currents drawn by the at least two amplifiers.

9. The method of claim 6, wherein selecting a MIMO configuration based on the parameter includes applying a matrix of multiplicative weights to the modulated signals to be transmitted and summing weighted modulated signals.

10. The method of claim 6, wherein the MIMO configuration is selected based on information received by the transmitter about a communication channel from the transmitter.

11. An apparatus for controlling a multiple-input multiple output (MIMO) configuration in a transmitter for a communication system, the transmitter having at least two antennas, at least two amplifiers, a switching network configured for connecting the at least two amplifiers to the at least two antennas, and a configuration processor configured for applying a selected one of at least two configuration matrices to modulated signals to be transmitted before the modulated signals are provided to the at least two amplifiers, each of the at least two configuration matrices corresponding to a respective MIMO configuration, the apparatus comprising:
   an electronic processor circuit configured for monitoring a parameter that corresponds to a current consumption of the transmitter; for determining whether a predetermined condition of the parameter has occurred; and if it is determined that the predetermined condition has occurred, for autonomously selecting a MIMO configuration based on the parameter,
   wherein the electronic processor circuit is configured for selecting a MIMO configuration based on the parameter by at least determining to reduce the current consumption, applying an antenna-switching matrix to the signals to be transmitted, and configuring the switching network such that matrix-processed signals to be transmitted are directed to one of the at least two amplifiers and one of the at least two antennas.

12. The apparatus of claim 11, wherein the electronic processor circuit configures the switching network such that one of the at least two amplifiers is connected to a selected one of the at least two antennas, and others of the at least two amplifiers are powered down.

13. The apparatus of claim 11, wherein the parameter corresponds to a transmitted power level of the transmitter or currents drawn by the at least two amplifiers.

14. The apparatus of claim 11, wherein the electronic processor circuit is configured for selecting a MIMO configuration based on the parameter by at least applying a matrix of multiplicative weights to the modulated signals to be transmitted and summing weighted modulated signals.

15. The apparatus of claim 11, wherein the electronic processor circuit is configured for selecting a MIMO configuration based on information received by the transmitter about a communication channel from the transmitter.

16. An apparatus for controlling a multiple-input multiple output (MIMO) configuration in a transmitter for a communication system, the transmitter having at least two antennas, at least two amplifiers, a switching network configured for connecting the at least two amplifiers to the at least two antennas, and a configuration processor configured for applying a selected one of at least two configuration matrices to modulated signals to be transmitted before the modulated signals are provided to the at least two amplifiers, each of the at least two configuration matrices corresponding to a respective MIMO configuration, the apparatus comprising:

an electronic processor circuit configured for monitoring a parameter that corresponds to a current consumption of the transmitter; for determining whether a predetermined condition of the parameter has occurred; and if it is determined that the predetermined condition has occurred, for autonomously selecting a MIMO configuration based on the parameter, wherein the electronic processor circuit is configured for selecting the MIMO configuration based by at least comparing a transmitter value and a first threshold value, and when the transmitter value is less than the first threshold value, applying an antenna-switching matrix to the signals to be transmitted, and configuring the switching network such that matrix-processed signals to be transmitted are directed to one of the at least two amplifiers and one of the at least two antennas.

17. The apparatus of claim 16, wherein selecting the MIMO configuration further includes, if the transmitter value of the parameter is not less than the first threshold value, comparing the transmitter value and a second threshold value, and when the transmitter value exceeds the second threshold value, applying a beam-forming matrix to signals to be transmitted and configuring the switching network such that matrix-processed signals to be transmitted are directed to all of the at least two amplifiers and all of the at least two antennas.

18. The apparatus of claim 16, wherein the parameter corresponds to a transmitted power level of the transmitter or currents drawn by the at least two amplifiers.

19. The apparatus of claim 16, wherein the electronic processor circuit is configured for selecting a MIMO configuration based on the parameter by at least applying a matrix of multiplicative weights to the modulated signals to be transmitted and summing weighted modulated signals.

20. The apparatus of claim 16, wherein the electronic processor circuit is configured for selecting a MIMO configuration based on information received by the transmitter about a communication channel from the transmitter.

* * * * *